United States Patent
Zhang et al.

(10) Patent No.: US 8,942,378 B2
(45) Date of Patent: Jan. 27, 2015

(54) METHOD AND DEVICE FOR ENCRYPTING MULTICAST SERVICE IN PASSIVE OPTICAL NETWORK SYSTEM

(75) Inventors: Dezhi Zhang, Guangdong Province (CN); Liquan Yuan, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 131 days.

(21) Appl. No.: 13/257,731

(22) PCT Filed: Nov. 10, 2010

(86) PCT No.: PCT/CN2010/078611
§ 371 (c)(1),
(2), (4) Date: Sep. 20, 2011

(87) PCT Pub. No.: WO2011/088700
PCT Pub. Date: Jul. 28, 2011

(65) Prior Publication Data
US 2012/0308006 A1  Dec. 6, 2012

(30) Foreign Application Priority Data
Jan. 25, 2010  (CN) .......................... 2010 1 0102646

(51) Int. Cl.
H04L 9/30 (2006.01)
H04Q 11/00 (2006.01)
H04L 9/08 (2006.01)

(52) U.S. Cl.
CPC .......... *H04Q 11/0062* (2013.01); *H04L 9/0891* (2013.01); *H04Q 2011/0088* (2013.01)
USPC ......................................... 380/256; 713/163

(58) Field of Classification Search
CPC ................. H04Q 11/0062; H04Q 2011/0088; H04L 9/0891
USPC ......................................... 380/256; 713/163
See application file for complete search history.

(56) References Cited

U.S. PATENT DOCUMENTS 7,301,968 B2 * 11/2007 Haran et al. .................. 370/508
2004/0136372 A1 * 7/2004 Gruia ............................ 370/390

(Continued)

FOREIGN PATENT DOCUMENTS

CN  1855834  * 10/2006  .................... 380/256
CN  1866857  * 10/2006  .................... 380/256

(Continued)

OTHER PUBLICATIONS

Jiang et al. "Multicast Broadcast Services Support in OFDMA-Based WiMAX Systems", IEEE, Aug. 2007.*

(Continued)

*Primary Examiner* — Saleh Najjar
*Assistant Examiner* — Oleg Korsak
(74) *Attorney, Agent, or Firm* — Ling Wu; Stephen Yang; Ling and Yang Intellectual Property (57) ABSTRACT

A method for encrypting multicast services in a passive optical network system is provided in the present invention, and the method includes: an Optical Line Terminal (OLT) generating a public key, and using the public key to encrypt the multicast service data in a bearer channel and then transmitting the encrypted data, the multicast service data in the same one bearer channel being encrypted using the same public key; and said OLT sending the public key, which is used to encrypt the multicast service data, via a management control channel to an Optical Network Unit (ONU) which is activated successfully and requests to receive said multicast service data. A device for encrypting multicast services in a passive optical network system is also provided in the present invention.

13 Claims, 4 Drawing Sheets

(56) References Cited

U.S. PATENT DOCUMENTS

| | | |
|---|---|---|
| 2006/0031936 A1 | 2/2006 | Nelson et al. |
| 2007/0133800 A1 | 6/2007 | Kim et al. |
| 2008/0155255 A1* | 6/2008 | Ohira et al. ................. 713/160 |
| 2010/0174901 A1* | 7/2010 | Khermosh et al. ............ 713/160 |
| 2010/0239252 A1* | 9/2010 | Davis et al. ..................... 398/58 |
| 2011/0029773 A1* | 2/2011 | Effenberger ................. 713/168 |
| 2012/0128155 A1* | 5/2012 | Effenberger ................. 380/256 |

FOREIGN PATENT DOCUMENTS

| | | |
|---|---|---|
| CN | 1855834 A | 11/2006 |
| CN | 1866857 A | 11/2006 |
| CN | 101547086 A | 9/2009 |
| JP | 2000228668 A | 8/2000 |

OTHER PUBLICATIONS

International Search Report for PCT/CN2010/078611 dated Jan. 21, 2011.

CN101547086A; Automatically Translated by the Intellectual Property Publishing House of SIPO, Mar. 21, 2013 see pp. 1-12.

XP11382244, On EPON Security Issues; The Electronic Magazine of Original Peer-Reviewed Survey Articles; 1st Quarter 2007, vol. 9, No. 1; pp. 68-83.

* cited by examiner

METHOD AND DEVICE FOR ENCRYPTING MULTICAST SERVICE IN PASSIVE OPTICAL NETWORK SYSTEM

TECHNICAL FIELD

The present invention relates to the field of optical communication, and more especially, to a method and device for encrypting multicast service data in passive optical network (PON) system.

BACKGROUND OF THE RELATED ART

The structure of a PON is that one PON port corresponds to a plurality of optical network units (ONU) that are the PON terminal users, moreover, in the downlink, each ONU is able to receive all the data sent from the Optical Line Terminal (OLT) of office side, and "each ONU" mentioned here might be a legal user or a malicious user:

A user who has legal registration information, and can be activated by interacting messages with the OLT after physically connecting to a certain branch optical fiber of the PON is called a legal user;

A user who doesn't have legal registration information, and neglects the registration request sent from the OLT after physically connecting to a certain branch optical fiber of the PON, but only receives the downlink information is called a malicious user.

If it is a legal user, after connecting physically to one branch optical fiber and before being activated successfully, it still can receive various plaintext data packets sent from the OLT PON port. To date, the PON techniques define some encryption mechanisms, such as the Advanced Encryption Standard (AES) encryption mechanism in the Gigabit-Capable Passive Optical Network (GPON) system or the stirring encryption mechanism and the triple stirring encryption mechanism in the Ethernet Passive Optical Network (EPON) system and so on, these encryption mechanisms, however, are unicast encryption mechanisms. For multicast data (that is, only one service data is sent from the OLT PON port, and all users or part of users who meet the requirements receive and use the service data), there is no effective encryption mechanism right now. Generally, the operators set a universal key in the overall network range to encrypt the services, whose disadvantage is that once the key is acquired by a malicious user, all service content in the overall network will be decrypted and stolen.

The method applied by the operators in the PON right now is to duplicate the multicast service data packets to each PON port and the unicast channel of the ONU, and the unicast mechanism is applied to carry out encryption so as to protect the multicast service data from being stolen by malicious users. This method, however, needs to send the key to each ONU, which increases the burden of the OLT.

SUMMARY OF THE INVENTION

The technical problem to be solved by the present invention is to provide a method and device for encrypting multicast service in a passive optical network (PON) system to increase the security and reduce the complexity of OLT encryption mechanism and the burden of the OLT.

In order to solve the above technical problem, the present invention provides a method for encrypting multicast service in a PON system, and the method comprises:

an optical line terminal (OLT) generating a public key, and using the public key to encrypt multicast service data in a bearer channel and then sending encrypted data, the multicast service data in a same one bearer channel using a same public key to carry out encryption; and said OLT sending the public key applied in encrypting the multicast service data via a management control channel to an optical network unit (ONU) that is activated successfully and applies to receive said multicast service data.

Said method also comprises:

after said ONU obtains the public key, using said public key to decrypt the multicast service data that the ONU applies to receive in the bearer channel.

Said method also comprises:

said OLT generating the public key and setting an aging time for the public key, and after the aging time arrives, it regenerating a new public key, and using the new public key to encrypt the multicast service data in the bearer channel, and sending the new public key to the ONU that is activated successfully and applies for the multicast service data.

The step of said OLT sending the public key applied in encrypting the multicast service data to the ONU that is activated successfully and applies to receive said multicast service data comprises:

the OLT judging that the ONU is activated successfully and applies to receive the multicast service data and actively sending the public key applied in encrypting the multicast service data to said ONU; alternatively the ONU sending a key request to the OLT, and said OLT detecting that the ONU is activated successfully and applies to receive the multicast service data, then the OLT sending the public key applied in encrypting said multicast service data to the ONU.

The multicast service data in different bearer channels might use different public keys or the same public key.

In the step of said OLT sending the public key to the ONU that is activated successfully and applies to receive said multicast service data, said OLT also sends the ONU a bearer channel identification of the bearer channel where the multicast service data is encrypted with the public key.

In order to solve the abovementioned technical problem, the present invention also provides a device for encrypting multicast service in a passive optical network (PON) system, and the device comprises a key generation unit, an encryption unit and a sending unit, wherein:

said key generation unit is configured to: generate a public key;

said encryption unit is configured to: encrypt multicast service data born in a same one bearer channel with a same public key;

said sending unit is configured to: send the encrypted multicast service data, and send the public key used in encrypting the multicast service data via a management control channel to an optical network unit (ONU) that is activated successfully and applies to receive the multicast service data.

said device also comprises an aging time setting unit, and said aging time setting unit is configured to: set an aging time for the public key, and when the aging time arrives, notify said key generation unit to regenerate a public key.

said sending unit is configured to apply a following method to send the public key applied in encrypting the multicast service data to the ONU that is activated successfully and applies to receive the multicast service data: after judging that the ONU is activated successfully and applies to receive the multicast service data, actively sending the public key applied in encrypting the multicast service data to said ONU; alternatively, after receiving a key request from the ONU, judging that the ONU is activated successfully and applies to receive the multicast service data, and then sending the public key applied in encrypting the multicast service data to the ONU.

Said sending unit is also configured to: at the same time when sending the public key to the ONU which is activated successfully and applies to receive the multicast service data, send the ONU a bearer channel identification of the bearer channel where the multicast service data is encrypted with the public key.

With the bearer channel encryption mechanism, the present invention reduces the complexities of the OLT encryption mechanism and the ONU decryption mechanism on the premise of guaranteeing the encryption of the multicast service. Compared with the multicast service encryption mechanism in the prior art, it limits the range affected by disclosing the key from the whole network to a certain PON port, thus improve the security of the multicast service content.

In addition, since the multicast service data born in the PON is transmitted after encrypted, and the key is only sent to the users that are activated successfully, the malicious users cannot acquire the key, nor the legal users before registration, thus it prevents illegal behaviors of the malicious users such as stealing the multicast service content, meanwhile, it does not affect the legal users normally using the encrypted multicast service after being activated.

BRIEF DESCRIPTION OF DRAWINGS

The accompanying figures here are used to further illustrate the present invention and are a part of the application, and the illustrative embodiments of the present invention are used to illustrate the present invention rather than limit the present invention improperly. In the accompanying figures.

PREFERRED EMBODIMENTS OF THE PRESENT INVENTION

The inventive concept of the present invention is that: the OLT generates a public key and uses the public key to encrypt the multicast service data in the bearer channel and then sends the encrypted data, the data in the same one bearer channel is encrypted with the same public key; said OLT sends the public key applied in encrypting the multicast service data to the ONU that is activated successfully and applies to receive said multicast service data via a management control channel (such as the optical network terminal (ONT) management control interface (OMCI) or the operation administration maintenance (OAM)).

After the ONU acquires the public key, it uses the key to decrypt the multicast service data that the ONU applies to receive in the bearer channel.

Preferably, the OLT regularly maintains the public key, and generates the public key and sets an aging time (with a timer) for the public key, and after the aging time arrives, regenerates a public key and use the new public key to encrypt the multicast service data in the bearer channel, and sends the newly generated public key to the ONU that is activated successfully and applies to receive the multicast service data. The aging time for a plurality of public keys can be the same or different. Alternatively, the OLT can update the public key at anytime if needed.

Said bearer channel is a logical channel of the PON, and it can be the general encapsulation model (GEM) channel born by the GPON port or the logical link identification (LLID) channel of the EPON port, and it is maintained and updated by the OLT.

Said management control channel might also be a logical channel of the PON, such as a physical layer operation administration maintenance (PLOAM) channel or an OMCI channel in the GPON system, or an extended OAM channel in the EPON system. Alternatively, a digital channel can be applied to send the public key.

The OLT can generate a plurality of public keys at the same time to encrypt the data in different bearer channels respectively. Preferably, the public keys of the bearer channels at the same one PON port might be the same or different, for example, a different public key can be set in each bearer channel, or the same public key can be used in part of the bearer channels.

When the OLT encrypts the multicast data in a plurality of bearer channels, and these bearer channels might send data to the same ONU, the OLT can send the ONU the bearer channel identification of the bearer channel where the multicast service data is encrypted with the public key at the same time when sending the ONU the public key, that is, sending the bearer channel identification of the bearer channel that bears the multicast service data to the ONU so that the ONU can decrypt the data. This does not exclude the case that the ONU finds out the bearer channel that uses this public key by carrying out decryption one by one.

The embodiments of the present invention will be illustrated in detail in combination with the accompanying figures. It should be noted that, without confliction, the embodiments in this application and the characteristics of the embodiments could be randomly combined.

The First Embodiment

Figure 1:
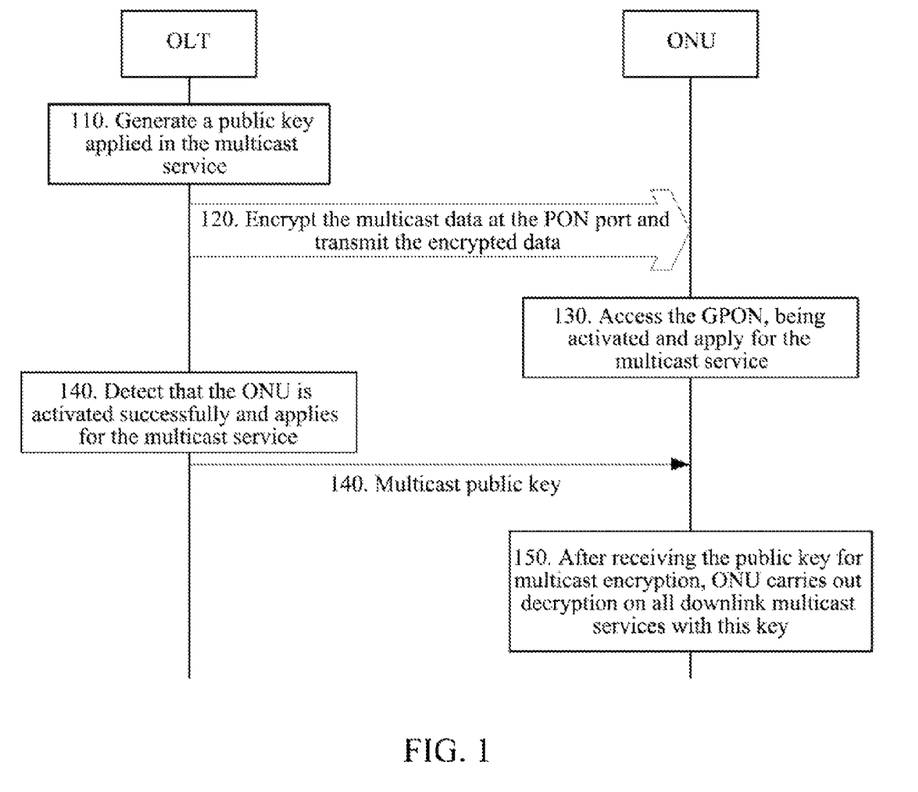
FIG. 1 is a flow chart of a first embodiment of the present invention.

The present embodiment is an embodiment of transmitting the public key in the GPON system, and the application range is the overall GPON physical port, and as shown in FIG. 1, the procedure comprises:

Step 110. The OLT generates a public key to be used in the multicast service;

Step 120. The OLT encrypts the multicast data to be sent at the PON port and transmits the encrypted data;

Step 130. The ONU powers on, accesses the GPON, and initiates a registration to the OLT and applies for the multicast service;

the specific procedure of registration and multicast service application has been defined relevantly in the GPON protocol and will be omitted here.

Step 140. The OLT detects that the ONU is activated successfully and applies for multicast service, and sends the generated public key to the ONU;

there is a record in the OLT no matter whether the ONU is activated successful or not as well as no matter which kind of multicast service the ONU applies for.

According to its own policy, the OLT sends the public key to the ONU after it detects that the ONU successfully applies for the multicast service or as long as it detects that the ONU applies for the multicast service.

The OLT can use the PLOAM channel in the GPON protocol, the OMCI channel or other channel (such as a digital channel) to send the multicast public key to the ONU that is activated successfully.

Step 150. After the ONU receives the public key for multicast encryption, it carries out decryption on all downlink multicast services with this key.

The Second Embodiment

Figure 2:
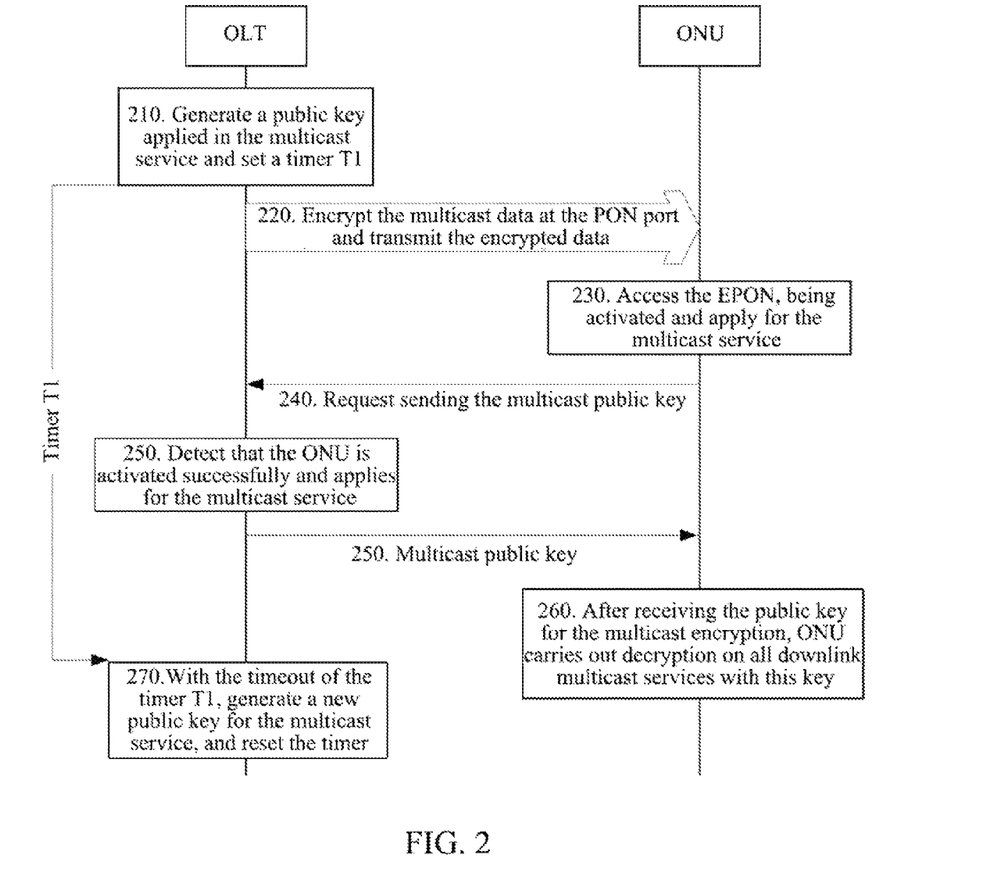
FIG. 2 is a flow chart of a second embodiment of the present invention.

The present embodiment is an embodiment of transmitting the public key and updating the key in the EPON system, and the application range is the overall EPON physical port, and as shown in FIG. 2, the procedure comprises:

Step 210. The OLT generates a public key to be used in the multicast service, and sets a timer T1 for this public key;

the timer is used to control the aging time of the public key.

Step 220. The OLT encrypts the multicast data to be sent at the PON port and transmits the encrypted data;

Step 230. The ONU powers on, accesses the EPON, and initiates a registration to the OLT and applies for the multicast service;

the specific procedure of registration and multicast service application has been defined relevantly in the EPON protocol and will be omitted here.

Step 240. The ONU requests the OLT to send a public key of multicast service;

Step 250. After the OLT receives the request of the ONU, if it searches out that the ONU is in the state of successful registration and applies for the multicast service, then the OLT sends the generated public key to the ONU;

according to its own policy, the OLT sends a public key to the ONU after it detects that the ONU successfully applies for the multicast service or as long as it detects that the ONU applies for the multicast service.

Step 260. After the ONU receives the public key for multicast encryption, it carries out decryption on all downlink multicast services with this key.

Step 270. When the time set in the timer T1 arrives, the OLT regenerates a new public key and resets the timer T1 (so as to update the key after the time set in the timer T1 arrives again).

When there is another ONU requesting the OLT to send the public key of the multicast service, the OLT sends the newly generated public key to the ONU that requests the public key. Moreover, the OLT also needs to update the public key for the ONU to which the public key has been sent.

The OLT can use the management control channel (such as the extended OAM channel) in the EPON system or a digital channel to transmit the generated multicast public key to the ONU that is activated successfully.

The Third Embodiment

Figure 3:
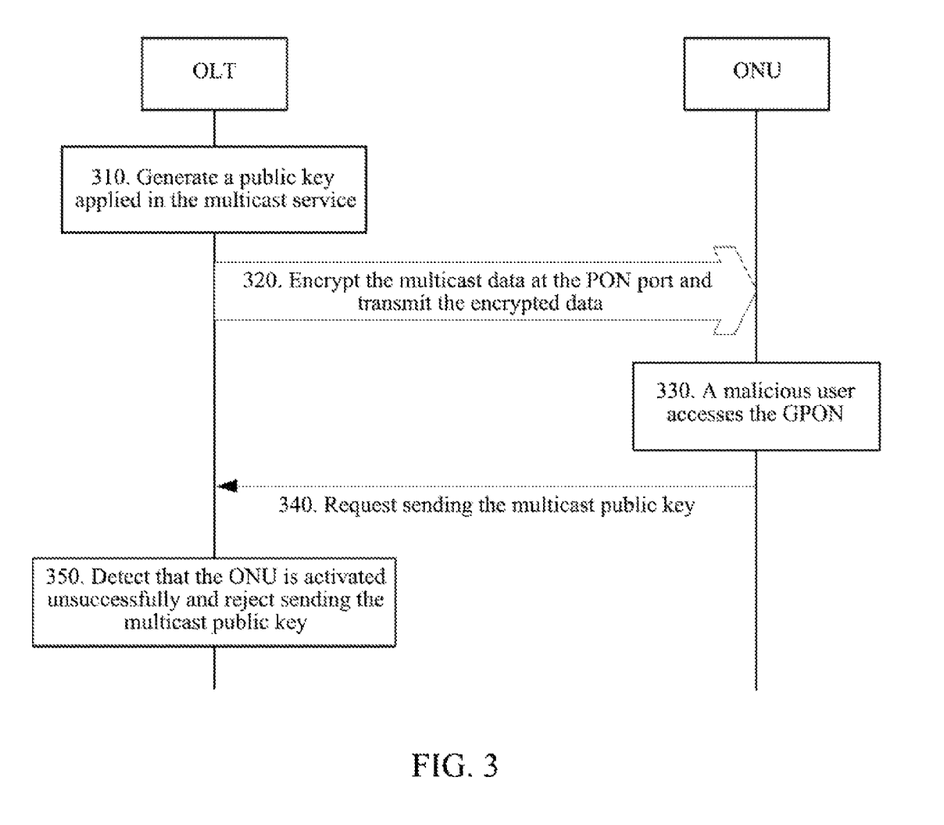
FIG. 3 is a flow chart of a third embodiment of the present invention.

The present embodiment is an embodiment of rejecting a malicious user trying to access the service in the GPON system, and the application range is the overall GPON physical port, and as shown in FIG. 3, the procedure comprises:

Step 310. The OLT generates a public key to be used in the multicast service;

Step 320. The OLT encrypts the multicast data to be sent at the PON port and transmits the encrypted data;

Step 330. A malicious user ONU accesses the GPON;

The malicious user might not initiate a registration after accessing the GPON, and once it does, the registration must be unsuccessful and the malicious user cannot apply for the multicast service.

Step 340: the malicious user ONU requests the OLT to send the public key of the multicast service;

Step 350: after the OLT receives the request, it searches out that the ONU is not activated successfully and rejects to send the public key of the multicast.

Right now, the malicious ONU cannot acquire the public key of the multicast, thus it cannot decrypt the multicast service content, and the operators prevent the malicious users from stealing the content.

The Fourth Embodiment

Figure 4:
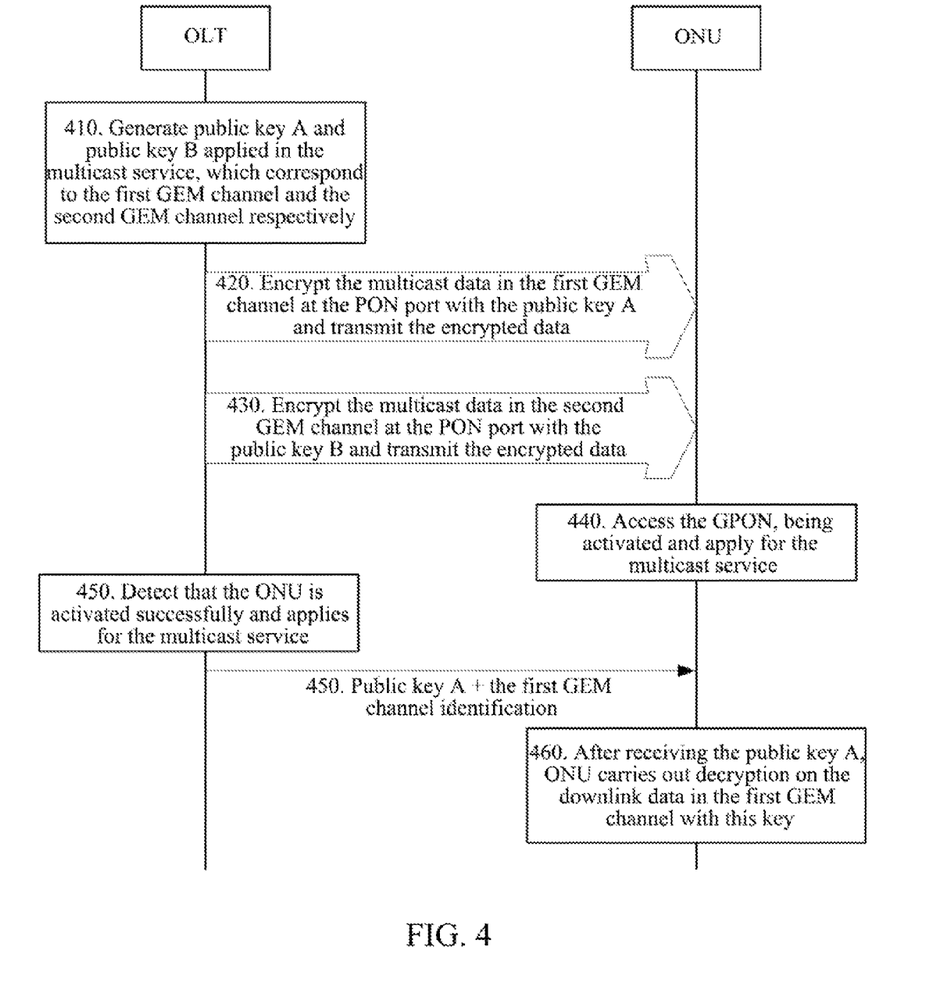
FIG. 4 is a flow chart of a fourth embodiment of the present invention.

The present embodiment is an embodiment of transmitting the public key in the GPON system, and the application range is one GEM channel corresponding to a certain multicast service in the GPON physical port, and the ONU in this embodiment only applies for the multicast service in the first GEM channel, and as shown in FIG. 4, the procedure comprises:

Step 410. The OLT generates a multicast public key A to be used in the first GEM channel and generates a multicast public key B to be used in the second GEM channel;

Step 420. The OLT uses the public key A to encrypt the multicast service data born in the first GEM channel and transmits the encrypted data, and all the ONUs in this channel share the public key A;

Step 430. The OLT uses the public key B to encrypt the multicast service data born in the second GEM channel and transmits the encrypted data, and all the ONUs in this channel share the public key B;

The executing order of the abovementioned steps 420 and 430 is not fixed.

Step 440. The ONU powers on, accesses the GPON, and initiates a registration to the OLT and applies for the multicast service;

Step 450. The OLT detects that the ONU is activated successfully and applies to receive the multicast service in the first GEM channel, then the OLT sends the public key A and the corresponding first GEM channel identification to the ONU;

in other embodiments, the ONU might also actively initiate a key request.

According to its own policy, the OLT might send the public key to the ONU after it detects that the ONU successfully applies for the multicast service or as long as it detects that the ONU applies for the multicast service.

Step 460. After the ONU receives the public key A and the corresponding first GEM channel identification, it decrypts the multicast service data transmitted in the first GEM channel.

Since ONU1 does not receive the public key B, it cannot decrypt the downlink data in the second GEM channel. It can be seen that when the same one ONU receives a plurality of multicast services that are born in different bearer channels, the OLT needs to send the ONU the bearer channel identification corresponding to the public key at the same time when sending the public key.

The OLT can use the PLOAM maintenance channel in the GPON protocol, the OMCI management channel or other channel to send the multicast public key to the ONUs that are activated successfully.

One public key can be used in one GEM channel or a plurality of GEM channels, that is, several GEM channels share one key.

The OLT for implementing the abovementioned method comprises a key generation unit, an encryption unit and a sending unit, wherein:

said key generation unit is configured to: generate a public key;

said encryption unit is configured to: encrypt the multicast service data born in the same one bearer channel with the same public key;

said sending unit is configured to: send the encrypted multicast service data, and send the public key used in encrypting the multicast service data to the ONU that is activated successfully and applies to receive the multicast service data via the management control channel.

Preferably, the device also comprises:

an aging time setting unit, which is configured to: set an aging time for the public key generated by the key generation unit, and when the aging time arrives, notifying the key generation unit to regenerate a public key.

Said sending unit is also configured to: at the same time when sending the public key to the ONU that is activated successfully and applies to receive the multicast service data, send the ONU the bearer channel identification of the bearer channel where the multicast service data is encrypted with the public key.

Said sending unit is also configured to: after judging that the ONU is activated successfully and applies to receive the multicast service data, actively send the public key applied in encrypting the multicast service data to said ONU; alternatively, after receiving a key request from the ONU, judge that the ONU is activated successfully and applies to receive the multicast service data, and then send the ONU the public key applied in encrypting the multicast service data.

It is understood by those skilled in the field that some or all steps in the above-mentioned method can be implemented by instructing the relevant hardware by program, and said program can be stored in the computer readable storage media, such as read only memory, a magnetic disk or an optical disk. Optionally, some or all steps in the abovementioned embodiment can be implemented with one or more integrated circuits. Correspondingly, each module/unit in the abovementioned embodiments can be implemented in the form of hardware or software function modules. The present invention is not limited to any combination of hardware and software in any special form.

The above description is the preferred embodiments of the present invention rather than restriction of the present invention, and for those skilled in the field, there are various modifications and variations in the present invention. Without departing from the spirit and essence of the present invention, all these types of modification, equivalent replacement or variations should belong to the protection scope of the present invention.

Industrial Applicability

With the bearer channel encryption mechanism, the present invention reduces the complexities of the OLT encryption mechanism and the ONU decryption mechanism on the premise of ensuring the encryption of the multicast service. Compared with the multicast service encryption mechanism in the prior art, it limits the range affected by disclosing the key from the whole network to a certain PON port, thus improve the security of the multicast service content.

In addition, since the multicast service data born by the PON is transmitted after encrypted, and the key is only sent to the users that are activated successfully, the malicious users cannot acquire the key, nor the legal users before the registration, thus it prevents illegal behaviors of the malicious users, such as stealing the multicast service content, and it does not affect the legal users normally using the encrypted multicast service after being activated successfully at the same time.

What is claimed is:

1. A method for encrypting multicast service in a passive optical network system, the method comprising:
   an optical line terminal (OLT) generating a common key, and using the common key to encrypt multicast service data of all different multicast services in a same bearer channel and then sending encrypted data, wherein the multicast service data of all different multicast services in the same one bearer channel use a same common key to carry out encryption; and
   said OLT sending the common key applied in encrypting the multicast service data via a management control channel to an optical network unit (ONU) that is activated successfully and applies to receive said multicast service data.

2. The method of claim 1, further comprising:
   after obtaining the common key, said ONU using said common key to decrypt all the multicast service data, which the ONU applies to receive, in the bearer channel.

3. The method of claim 2, further comprising:
   said OLT generating the common key and setting an aging time for the common key, and after the aging time arrives, it regenerating a new common key, and using the new common key to encrypt the multicast service data in the bearer channel, and sending the new common key to the ONU that is activated successfully and applies for the multicast service data.

4. The method of claim 2, wherein:
   in the step of said OLT sending the common key to the ONU that is activated successfully and applies to receive said multicast service data, said OLT also sends the ONU a bearer channel identification of the bearer channel where all multicast service data are encrypted with the common key.

5. The method of claim 1, further comprising:
   said OLT generating the common key and setting an aging time for the common key, and after the aging time arrives, it regenerating a new common key, and using the new common key to encrypt the multicast service data in the bearer channel, and sending the new common key to the ONU that is activated successfully and applies for the multicast service data.

6. The method of claim 1, wherein:
   the step of said OLT sending the common key applied in encrypting the multicast service data to the ONU that is activated successfully and applies to receive said multicast service data comprises:
   the OLT judging that the ONU is activated successfully and applies to receive the multicast service data, and actively sending the common key applied in encrypting the multicast service data to said ONU; or
   the ONU sending a key request to the OLT, and said OLT detecting that the ONU is activated successfully and applies to receive the multicast service data, then the OLT sending the common key applied in encrypting said multicast service data to the ONU.

7. The method of claim 1, wherein:
   the multicast service data in different bearer channels use different common keys or the same common key.

8. The method of claim 1, wherein:
   in the step of said OLT sending the common key to the ONU that is activated successfully and applies to receive said multicast service data, said OLT also sends the ONU a bearer channel identification of the bearer channel where all multicast service data are encrypted with the common key.

9. A device for encrypting multicast service in a passive optical network system, and the device comprising a key generation unit, an encryption unit and a sending unit, wherein:
   said key generation unit is configured to: generate a common key;
   said encryption unit is configured to: encrypt multicast service data of all different multicast services born in a same one bearer channel with a same common key;

said sending unit is configured to: send the encrypted multicast service data, and send the common key applied in encrypting the multicast service data via a management control channel to an optical network unit (ONU) that is activated successfully and applies to receive the multicast service data.

10. The device of claim 9, wherein,
said device also comprises an aging time setting unit, and said aging time setting unit is configured to: set an aging time for the common key, and when the aging time arrives, notifying said key generation unit to regenerate a common key.

11. The device of claim 9, wherein:
said sending unit is configured to apply following methods to send the common key applied in encrypting the multicast service data to the ONU that is activated successfully and applies to receive the multicast service data: after judging that the ONU is activated successfully and applies to receive the multicast service data, actively sending the common key applied in encrypting the multicast service data to said ONU; or, after receiving a key request from the ONU, judging that the ONU is activated successfully and applies to receive the multicast service data, and then sending the common key applied in encrypting the multicast service data to the ONU.

12. The device of claim 9, wherein,
said sending unit is also configured to: send the common key to the ONU which is activated successfully and applies to receive the multicast service data, and also send the ONU a bearer channel identification of the bearer channel where all multicast service data are encrypted with the common key.

13. The device of claim 11, wherein,
said sending unit is also configured to: send the common key to the ONU which is activated successfully and applies to receive the multicast service data, and also send the ONU a bearer channel identification of the bearer channel where all multicast service data are encrypted with the common key.

* * * * *